3,758,374
RUBBER-POLYESTER COMPOSITIONS
Boris Nicholas Leyland and Neil Frederick Wood, Manchester, England, assignors to Imperial Chemical Industries Limited, London, England
No Drawing. Filed May 4, 1971, Ser. No. 140,297
Claims priority, application Great Britain, May 14, 1970, 23,414/70
Int. Cl. B32b 25/02, 27/36
U.S. Cl. 161—231   10 Claims

ABSTRACT OF THE DISCLOSURE

Acids of the formula $R_2P \cdot OH$, wherein each R is a hydrogen atom or a hydroxy, optionally substituted hydrocarbyl or heterocyclic group, are incorporated into polyester-reinforced rubbers to prevent thermal degradation of the polyester.

---

This invention relates to compositions in which rubber is reinforced by polyester materials and more particularly to such compositions which contain phosphorus-containing acids to stabilise the polyester.

Polymeric materials, especially in the form of fibres, are frequently used in rubber compositions as reinforcing agents. Polyesters have some advantages over other polymeric materials, for example in greater strength and durability over rayon, and in higher dimensional stability and reduced setting at low temperatures over polyamides but suffer from the defect of tending to undergo degradation in contact with hot rubber compounds. It has now been found that this degradation may be hindered by acids containing phosphorus.

According to the invention there are provided compositions comprising rubber in contact with polyester material which contain one or more phosphorus-containing acids of the formula $R_2P.OH$, wherein each R, which may be the same or different, represents a hydrogen atom or a hydroxyl, alkyl, alkenyl, cycloalkyl, aryl, aralkyl or heterocyclic group which may optionally be substituted or a divalent group derived from these by loss of a hydrogen atom and linking the phosphorus atoms of two phosphorus-containing acid residues.

As examples of groups represented by R there are mentioned methyl, ethyl, n-propyl, iso-propyl, n-butyl, iso-butyl, sec.-butyl, tert.-butyl, octyl, nonyl, dodecyl, octadecyl, vinyl, allyl, propenyl, butenyl, styryl, chloroethyl, hydroxymethyl, hydroxyethyl, ethoxypropyl, $\beta$-phenoxyethyl, $\beta$-bromoethyl, cyclopropyl, cyclopentyl, cyclohexyl, methylcyclohexyl, phenyl, $\alpha$- and $\beta$-naphthyl, chlorophenyl, bromophenyl, hydroxyphenyl, alkoxyphenyl, nonylphenyl, ethylphenyl, benzyl, phenylethyl, pyridyl, furyl, tetrahydrofuryl, piperidyl, phenylene and alkylene groups such as methylene, ethylene, propylene, and butylene.

The rubber may be any natural or synthetic rubber, particularly a sulphur-curable rubber. The rubber may be vulcanised or unvulcanised but the process of the invention is of particular value with vulcanised rubbers. The presence of the phosphorus-containing acid is of especial benefit with natural rubber since the degradation of the polyester is normally more rapid in natural rubber than in synthetic rubbers.

As polyester there is meant a polymer of the type obtainable by condensation of one or more polyfunctional carboxylic acids with one or more polyfunctional alcohols, optionally with the inclusion of minor amounts of other compounds containing two or more active hydrogen atoms such as aminoalcohols, and especially fibre- or film-forming polymers derived from bifunctional reactants such as terephthalic acid and ethylene glycol. The polyester will normally be in fibre or fabric form but may be in film or other form used to reinforce rubber.

The phosphorus-containing acid may be incorporated into the compositions of the invention by any conventional means. The polyester may for example be impregnated with the phosphorus-containing acid before bringing into contact with the rubber, but it is preferred to add the phosphorus-containing acid to the unvulcanised rubber in a conventional rubber compounding plant at the same time as an any other rubber adjuvants, and then bring the rubber and polyester together and shape and vulcanise the compositions as desired. It is not necessary that the phosphorus-containing acid be present throughout the rubber composition but only that it be present in adequate amount in the region of any rubber/polyester interface, which may be achieved for example by bonding rubber not containing such an acid to polyester by means of a rubber mix containing the phosphorus-containing acid.

The phosphorus-containing acid is conveniently used in an amount between 0.1 and 10% and preferably between 0.5 and 3% of the weight of rubber containing the phosphorus-containing acid.

The rubber may contain any of the conventional adjuvants used in rubber technology, for example antioxidants, antioxonants, curing agents, accelerators, retarders, blowing agents, peptising agents, fillers and pigments. The presence of the phosphorus-containing acid is of especial benefit when the accelerator used is a sulphenamide, thiuram sulphide or dithiocarbamate, since the degradation of the polyester is normally especially severe with the use of these accelerators.

The compositions of the invention are of especial value in the manufacture of tyres, particularly tyres which are intended to be run at sustained high speeds when high temperatures may be generated. They are also, however, of value in other rubber/polyester compositions which may be exposed in manufacture or service to elevated temperatures such as conveyor belting.

The invention is illustrated but not limited by the following examples in which all the parts and percentages are by weight unless otherwise specified.

EXAMPLE 1

Rubber mixes of the following composition are compounded on a two-roll mill:

| | |
|---|---|
| Smoked sheet natural rubber | 100 |
| Zinc oxide | 3.5 |
| Stearic acid | 1.5 |
| General purpose furnace black | 35 |
| Processing oil | 3.0 |
| Sulphur | 2.5 |
| N-cyclohexylbenzthiazylsulphenamide | 1.0 |
| Phosphorus-containing acid | 3.0 |

Lengths of polyethylene terephthalate cord are embedded wholly in samples of the rubber mix and the samples heated in a mould under pressure at 170° C. for 2 hours both to cure the rubber and age the composition at an elevated temperature. The cured samples are then swelled in trichloroethylene for 18 hours, the rubber stripped from the cords, and the breaking strengths of the cords determined. The polyethylene terephthalate had an original breaking strength of 14.4 kg. All the cords before embedding in the rubber had been treated with a bonding agent and heat set.

The results are given in the table below:

| Phosphorus-containing acid: | Breaking strain (kg.) of polyester after ageing |
|---|---|
| None | 7.7 |
| Hypophosphorous acid | 11.3 |
| Di-n-octylphosphinous acid | 10.8 |
| Diphenylphosphinous acid | 8.5 |
| Dibenzylphosphinous acid | 10.9 |

EXAMPLE 2

The procedure of Example 1 is repeated using a polyester of original breaking strength 15.5 kg., and phosphorous acid as stabiliser. The cord after ageing had a strength of 12.2 kg. compared with 8.2 for an unstabilised cord.

EXAMPLE 3

The procedure for Example 1 is repeated with the phosphorus-containing acids listed below giving the results indicated.

| Phosphorus-containing acid | Cord strength, kg. | | |
|---|---|---|---|
| | Aged, without additive | Aged, with additive | Unaged |
| Phenylphosphorous acid | 7.7 | 11.2 | 15.4 |
| Phenyl α-methylbenzyl phosphinous acid | 7.9 | 10.4 | 15.5 |
| Di(n-hexyl)phosphinous acid | 7.4 | 11.6 | 15.5 |
| Bis(2,5-dimethylphenyl)phosphinous acid | 7.4 | 10.3 | 15.5 |

We claim:
1. Compositions comprising rubber in contact with polyester material which contain at the interface thereof one or more phosphorus-containing acids of the formula $R_2P.OH$, wherein each R, which may be the same or different, represents a hydrogen atom or a hydroxyl, alkenyl, cycloalkyl, aryl, aralkyl or heterocyclic group of 1 to 18 carbon atoms which may optionally be hydroxy, chloro, bromo or phenyl substituted or a divalent group derived from these by loss of a hydrogen atom and linking the phosphorus atoms of two phosphorus-containing acid residues.

2. Compositions as claimed in claim 1 wherein the rubber is vulcanised.

3. Compositions as claimed in claim 1 wherein the amount of phosphorus-containing acid is between 0.1 and 10%.

4. Compositions as claimed in claim 1 wherein the phosphorus-containing acid is hypophosphorous acid.

5. The composition of claim 1 wherein the phosphorus-containing acid is di-n-octylphosphinous acid.

6. The composition of claim 1 wherein the phosphorus-containing acid is diphenylphosphinous acid.

7. The composition of claim 1 wherein the phosphorus-containing acid is dibenzylphosphinous acid.

8. The composition of claim 1 wherein the phosphorus-containing acid is di(n-hexyl) phosphinous acid.

9. The composition of claim 1 wherein the phosphorus-containing acid is phenyl-alpha-methylbenzylphosphinous acid.

10. The composition of claim 1 wherein the phosphorus-containing acid is di(n-hexyl) phosphinous acid.

References Cited
UNITED STATES PATENTS

| | | | |
|---|---|---|---|
| 3,658,637 | 4/1972 | Danielson | 161—231 |
| 3,562,094 | 2/1971 | Chmiel | 161—231 |
| 3,410,749 | 11/1968 | Chmiel | 161—231 X |
| 2,961,365 | 11/1960 | Sroog | 161—231 X |
| 3,580,894 | 5/1971 | Lenke | 161—231 X |
| 3,591,550 | 7/1971 | Nitschmann et al. | 161—231 X |
| 3,644,136 | 2/1972 | McCullough | 117—162 X |
| 3,671,478 | 6/1972 | Doyle et al. | 161—231 X |
| 3,690,926 | 9/1972 | Wampetich et al. | 161—231 X |
| 3,697,310 | 10/1972 | Kurihara et al. | 117—138.8 F |
| 3,698,935 | 10/1972 | Yurcick et al. | 117—138.8 F |

HAROLD ANSHER, Primary Examiner

U.S. Cl. X.R.

117—138.8 F, 162; 161—239, 247; 260—3, 37 R, 40 R